United States Patent
Di Camillo

(10) Patent No.: US 8,226,159 B2
(45) Date of Patent: Jul. 24, 2012

(54) VEHICLE BODY, MORE PARTICULARLY LAND VEHICLE BODY

(75) Inventor: Dario Di Camillo, Colle Corvino (IT)

(73) Assignee: Concept Inn S.R.L., Rome (IT)

( * ) Notice: Subject to any disclaimer, the term of this patent is extended or adjusted under 35 U.S.C. 154(b) by 0 days.

(21) Appl. No.: 13/148,874

(22) PCT Filed: Feb. 11, 2010

(86) PCT No.: PCT/IB2010/050637
§ 371 (c)(1),
(2), (4) Date: Aug. 10, 2011

(87) PCT Pub. No.: WO2010/092547
PCT Pub. Date: Aug. 19, 2010

(65) Prior Publication Data
US 2011/0309654 A1   Dec. 22, 2011

(30) Foreign Application Priority Data
Feb. 11, 2009   (IT) .............. TO2009A0093

(51) Int. Cl.
*B60N 99/00* (2006.01)
(52) U.S. Cl. ................................. 296/203.01
(58) Field of Classification Search ............ 296/187.06, 296/187.03, 187.01, 193.05, 193.09, 203.01, 296/203.03, 203.02
See application file for complete search history.

(56) References Cited

U.S. PATENT DOCUMENTS

| 6,341,813 | B1 | 1/2002 | Taghaddos |
| 7,441,832 | B2 * | 10/2008 | Ratajski et al. ............... 296/212 |
| 7,828,106 | B1 * | 11/2010 | Ratajski et al. ............... 180/282 |
| 7,866,250 | B2 * | 1/2011 | Farinella et al. ............. 89/36.17 |
| 8,033,356 | B2 * | 10/2011 | Kim ............................. 180/271 |
| 2001/0000119 | A1 | 4/2001 | Jaekel et al. |
| 2003/0191222 | A1 | 10/2003 | Suzuki et al. |
| 2008/0129025 | A1 | 6/2008 | Ratajski et al. |

FOREIGN PATENT DOCUMENTS

| CN | 201 220 643 Y | 4/2009 |
| DE | 103 56 460 A1 | 7/2005 |
| WO | 89/03328 A1 | 4/1989 |

* cited by examiner

*Primary Examiner* — Lori Lyjak
(74) *Attorney, Agent, or Firm* — Sughrue Mion, PLLC

(57) ABSTRACT

Vehicle body provided with a metallic supporting structure having a plurality of rods, mutually fastened so as to form a three-dimensional rigid frame. The vehicle body further having a plurality of inflatable elements, filled with air or other gas. The vehicle body is fastened to the supporting structure and forms panels between the rods of the supporting structure. The inflatable elements are formed by a pair of walls made of composite plastic material, welded together along their perimeter so as to form an airtight body. The inflatable elements are inflated by means of injection of a set amount of air or other gas therein.

8 Claims, 2 Drawing Sheets

VEHICLE BODY, MORE PARTICULARLY LAND VEHICLE BODY

CROSS REFERENCE TO RELATED APPLICATIONS

This application is a National Stage of International Application No. PCT/IB2010/050637 filed Feb. 11, 2010, claiming priority based on Italian Patent Application No. TO2009A000093, filed Feb. 11, 2009, the contents of all of which are incorporated herein by reference in their entirety.

TECHNICAL FIELD

The present invention refers to a vehicle body, more particularly to a body for land vehicles intended for passengers or goods.

PRIOR ART

Land vehicles intended for passengers and goods transportation, and more particularly motor vehicles such as cars, vans and the like, are universally widespread.

In general, said vehicles comprise a chassis, to which the elements of the propulsion system and of the transmission system are fastened, and a body, the main function of which is to divide the inner space (or driving space) from the outer environment.

A vehicle body usually comprises a metallic supporting structure and a plurality of panels, also metallic, that are connected to said supporting structure so as to obtain lateral doors, rear door, front bonnet, roof and similar elements.

In known vehicles, the need of guaranteeing the safety of people and goods transported insides the vehicles leads to the utilization of materials having a high structural strength and—consequently—a high weight in the manufacturing of vehicle bodies.

By way of example, the weight of a car can be of 1.000 to 2.0000 kg.

When motor vehicles are concerned, this implies a high fuel consumption for the propulsion thereof.

It is evident that a high fuel consumption is a considerable drawback, both from the economical point of view and from the point of view of environmental pollution.

The main object of the present invention is to overcome the above-mentioned drawback by providing a vehicle body of reduced weight, allowing to decrease the fuel consumption of the vehicle carrying said vehicle body.

Another object of the present invention is to provide a vehicle body that guarantees a high safety for passengers and goods transported therein in case of accidents.

These and other objects of the invention are achieved by the vehicle body according to the invention, as claimed in the appended claims.

DISCLOSURE OF THE INVENTION

The vehicle body according to the invention comprises a metallic supporting structure and a plurality of inflatable elements fastened to said supporting structure.

Thanks to the fact that the metallic panels used in conventional vehicles for side doors, rear door, front bonnet, roof and similar elements are replaced by inflatable elements, the overall weight of the vehicle body according to the invention is considerably reduced with respect to conventional vehicles.

Advantageously, said inflatable elements are capable of effectively dampen impact shocks, thus guaranteeing the safety of passengers and goods transported in the vehicle in case of accidents.

Said inflatable elements can be applied either to the inside or to the outside of the supporting structure.

According to an embodiment of the invention, the vehicle body according to the invention comprises a plurality of inflatable elements that are separate and independent from each other.

According to another embodiment of the invention, said inflatable elements are made as a single inflatable body; according to this embodiment, the inflatable body is divided in a plurality of portions, separated from each other by welds acting as hinges for allowing the relative pivoting of a portion with respect to the other.

BRIEF DESCRIPTION OF THE DRAWINGS

Further features and advantages of the invention will be evident to the person skilled in the art from the following detailed description of some embodiments of the invention, given by way of non-limiting examples, with reference to the attached drawings, wherein.

DESCRIPTION OF SOME PREFERRED EMBODIMENTS OF THE INVENTION

Figure 1:
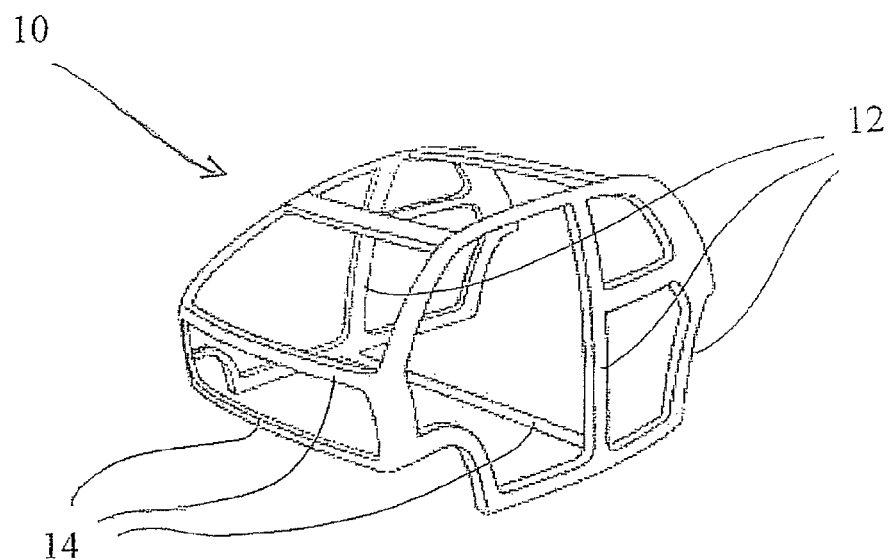
FIG. 1 is a schematic perspective view of the supporting structure of a vehicle body according to the invention.

With reference to FIG. 1, the supporting structure 10 of a vehicle body according to the invention is shown.

Said supporting structure 10 is made of metal and it comprises a plurality of substantially vertical rods 12 and of substantially horizontal rods 14, mutually fastened so as to form a three-dimensional rigid frame capable of supporting the weight of the vehicle and of the passengers therein.

The mechanical elements, the electrical and lighting elements and the internal finishing elements of the vehicle are connected to said supporting structure 10.

Figure 2:
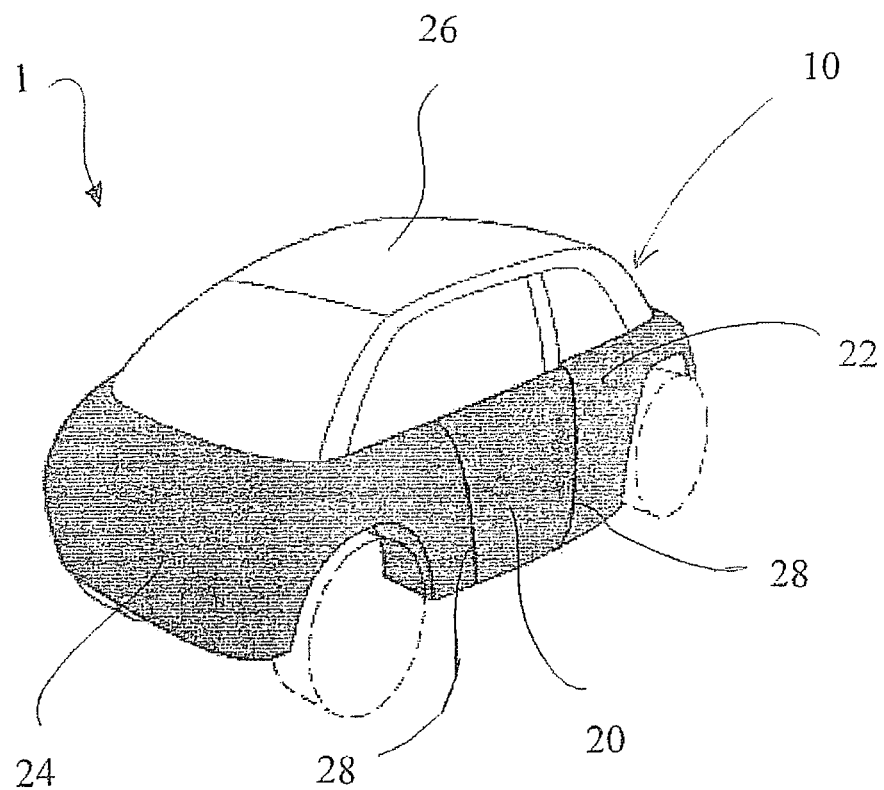
FIG. 2 is a schematic perspective view of a vehicle body according to a first preferred embodiment of the invention.

With reference now to FIG. 2, according to the invention the vehicle body 1 comprises a plurality of inflatable elements 20-26, filled with air or other gas, fastened to the supporting structure 10 and forming panels between the rods 12,14 of said supporting structure 10.

More particularly, said inflatable elements are used for making the side doors (elements 20,22), the front bonnet (element 24), the roof (element 26) of the vehicle 1, as well as the rear door, the bumpers and other similar elements of the vehicle body 1.

Said inflatable elements 20-26 are formed by a pair of walls made of composite plastic material and welded together along their perimeter, so as to form an airtight body, which is inflated by injection of air or other gas therein until the desired shape and pressure are obtained.

Preferably, said inflation step of the inflatable elements takes place once and for all during the manufacturing process of the vehicle body.

Nevertheless, as an alternative means for accessing the inflatable elements can be provided so that the amount of air or other gas contained therein can be varied also successively.

In the embodiment shown in FIG. 2, the inflatable elements 20-26 are fastened on the outside of the supporting structure 10.

Moreover, in the embodiment of FIG. 2, the inflatable elements 20-26 are made as a single body.

Said single body is divided by means of welds in a plurality of portions that are thus pivotally joined to each other; said welds are provided according to a pattern that allows each portion to carry out a respective function (side door, front bonnet, rear door, and so on) and that allows to delimit the zones intended for the fastening to the supporting structure 10.

Alternatively, it is obvious that it is also possible to provide the inflatable elements 20-26 as separate and independent elements, individually fastened to the supporting structure 10.

It will be evident to the person skilled in the art that the utilization of inflatable elements 20-26 replacing conventional metallic panels allows a drastic reduction of the weight of the vehicle body and—as a consequence—a considerable reduction of the fuel consumption of the vehicle itself, for the same performances.

Moreover, the provision of the inflatable elements 20-26 also allows to improve the capability of shock absorption of the vehicle body in case of impact.

Indeed, in case of impact the inflatable elements can get deformed, thus absorbing the shocks.

Furthermore, their size can be chosen so as to provide a volume sufficient for effectively absorbing large amounts of kinetic energy, especially in the region of the front and rear bumpers.

Moreover, according to a preferred embodiment of the invention, the inflatable elements 20-26 are equipped with a vent device (not shown), which is adequately calibrated for allowing the emission of a set amount of air or gas if the pressure inside said elements increases beyond a set threshold.

This deflation of the elements 20-26 contributes to absorb the shocks and, at the same time, reduces the bouncing of the vehicle.

Figure 3:
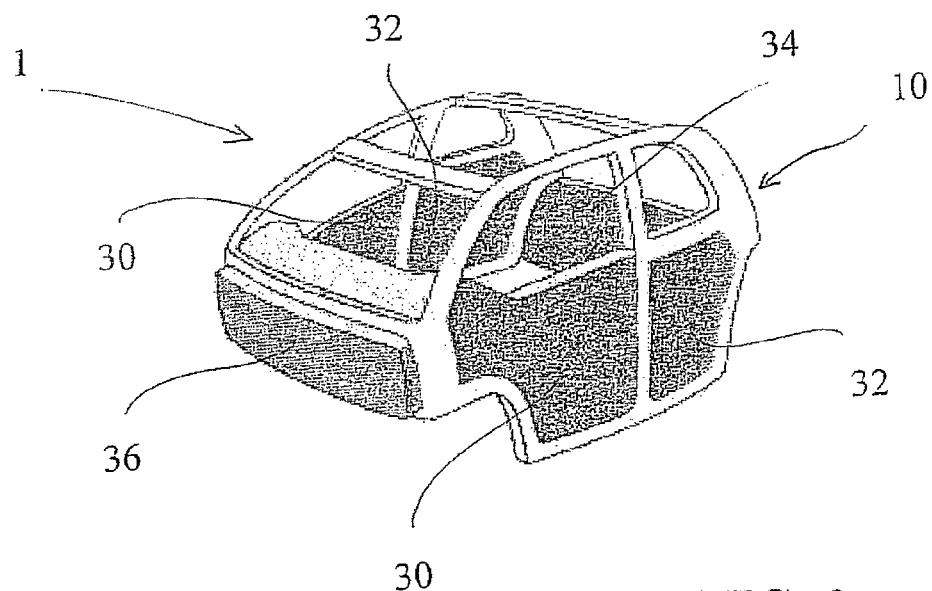
FIG. 3 is a schematic perspective view of a vehicle body according to a second preferred embodiment of the invention.

Therefore, the vehicle body according to the invention guarantees an increased safety in case of accident and it reduces the damages both to the passengers of the vehicle itself and to the other vehicles involved in the accident. With reference to FIG. 3, an alternative embodiment of the vehicle body 1 according to the invention is shown.

Such embodiment differs from the previously illustrated embodiment in that the inflatable elements 30-36 forming the side doors (elements 30,32), the rear door (element 34), the front bonnet (element 36) and similar elements are fastened on the inside of the rods of the supporting structure 10, and not on the outside thereof.

Also in this embodiment, the inflatable elements 30-36 can be provide either as a single body divided in a plurality of portion pivotally joined to each other or as a plurality of separate independent elements, individually fastened to the supporting structure 10.

From the above description, it is evident that the vehicle body according to the invention allows to achieve the above-indicated objects.

It is also evident that the detailed description provided herein has been solely given by way of example and that several variants and modifications can be made without departing from the scope of protection defined by the appended claims.

The invention claimed is:

1. Vehicle body provided with a metallic supporting structure comprising a plurality of rods, mutually fastened so as to form a three-dimensional rigid frame, said vehicle body further comprising a plurality of inflatable elements, filled with air or other gas, fastened to said supporting structure and forming panels between said rods of said supporting structure, wherein said inflatable elements are formed by a pair of walls made of composite plastic material, welded together along their perimeter so as to form an airtight body, which is inflated by means of injection of a set amount of air or other gas therein.

2. Vehicle body according to claim 1, wherein said inflatable elements are fastened on the outside of said supporting structure.

3. Vehicle body according to claim 1, wherein said inflatable elements are fastened on the inside of said supporting structure.

4. Vehicle body according to claim 1, wherein said inflatable elements are provided as separate independent elements, individually fastened to said supporting structure.

5. Vehicle body according to claim 1, wherein said inflatable elements are provided as a single body, divided in a plurality of portions pivotally joined to each other.

6. Vehicle body according to claim 5, wherein said single body is divided in said plurality of portions by means of welds.

7. Vehicle body according to claim 1, wherein means for accessing said inflatable elements are provided, so that the amount of air or other gas contained therein can be varied.

8. Vehicle body according to claim 1, wherein said inflatable elements are used for obtaining the side doors, the rear door, the front bonnet, the roof, the bumpers and other similar elements of said vehicle body.

* * * * *